(12) United States Patent
Baceiredo et al.

(10) Patent No.: US 8,779,078 B2
(45) Date of Patent: Jul. 15, 2014

(54) METHOD FOR CONDENSING SILYL UNITS USING A CARBENE CATALYST

(75) Inventors: Antoine Baceiredo, Toulouse (FR); Etienne Fleury, Irigny (FR); Tsuyoshi Kato, Toulouse (FR); Sébastien Marrot, Toulouse (FR); Larent Saint-Jalmes, Vourles (FR)

(73) Assignee: Bluestar Silicones France SAS, Lyon Cedex (FR)

( * ) Notice: Subject to any disclaimer, the term of this patent is extended or adjusted under 35 U.S.C. 154(b) by 1082 days.

(21) Appl. No.: 12/297,754

(22) PCT Filed: Apr. 20, 2007

(86) PCT No.: PCT/FR2007/000665
§ 371 (c)(1),
(2), (4) Date: Jul. 29, 2009

(87) PCT Pub. No.: WO2007/122325
PCT Pub. Date: Nov. 1, 2007

(65) Prior Publication Data
US 2009/0299024 A1 Dec. 3, 2009

(30) Foreign Application Priority Data
Apr. 21, 2006 (FR) ...................................... 06 03563

(51) Int. Cl.
*C08G 77/08* (2006.01)
(52) U.S. Cl.
USPC ............................................. 528/12; 528/34
(58) Field of Classification Search
USPC ..................................................... 528/12, 34
See application file for complete search history.

(56) References Cited

U.S. PATENT DOCUMENTS

| 2,985,544 | A | 5/1961 | Francis et al. |
| 3,504,051 | A | 3/1970 | McVannel et al. |
| 3,563,241 | A | 2/1971 | Evans et al. |
| 5,026,811 | A | 6/1991 | Kookootsedes |
| 5,079,324 | A | 1/1992 | Cocco et al. |
| 5,196,497 | A | 3/1993 | Weber et al. |
| 7,202,320 | B2 | 4/2007 | George et al. |
| 2008/0097064 | A1 | 4/2008 | Blanc-Magnard |

FOREIGN PATENT DOCUMENTS

| EP | 0457693 | 11/1991 |
| EP | 0564253 | 10/1993 |
| FR | 2604713 | 4/1988 |
| FR | 2864543 A1 | 7/2005 |
| WO | WO98/39346 | 11/1998 |

OTHER PUBLICATIONS

"International Search Report," International Patent Application No. PCT/FR07/00665 (Oct. 4, 2007).
International Search Report No. PCT/FR2007/000665, dated Sep. 20, 2007 (4 pages).

*Primary Examiner* — Kuo-Liang Peng
(74) *Attorney, Agent, or Firm* — Miles & Stockbridge P.C.

(57) ABSTRACT

A process for condensation between at least one ≡SiOH unit and at least one ≡SiOR unit is provided. In accordance with the present invention, R=a hydrogen or a $C_1$-$C_{20}$ hydrocarbon group optionally comprising one or more heteroatoms, and the ≡SiOH and ≡SiOR units belong to at least one identical or different (organo)silicon compound P. The process is conducted in the presence of an effective amount of at least one catalyst C, comprising a carbene. Compositions are also provided.

12 Claims, No Drawings

METHOD FOR CONDENSING SILYL UNITS USING A CARBENE CATALYST

CROSS REFERENCE TO RELATED APPLICATIONS

This application is a §371 National Stage Application of PCT/FR2007/000665 filed Apr. 20, 2007 which claims priority to French Application 0603563 filed Apr. 21, 2006.

BACKGROUND OF THE INVENTION

1. Field of the Invention

The field of the present invention is that of condensation or polycondensation processes in the field of silicones.

2. Description of Related Art

It is well known that it is possible to polycondense silanols, silanediols or polysiloxanediols in the presence of various compounds which accelerate the polycondensation by acting as dehydrating agent or as catalyst (cf., for example, the treatise by Walter Noll: Chemistry and Technology of Silicones; 1968 edition, pp. 211 to 218).

Mention may be made, among dehydrating agents, on the one hand, of acid compounds, such as sulfuric acid, phosphoric acid or acid chlorides, and, on the other hand, of nonacid compounds, such as isocyanates, boric esters, and the like. All these compounds have to be used in a stoichiometric proportion.

Mention may be made, among catalysts, of halogenated acids, basic catalysts, such as alkaline hydroxides, and amines, such as triethylamine. Finally, it is also possible to activate the polycondensation reaction by using organometallic compounds of metals such as lead, tin, zirconium, aluminum, calcium, sodium or potassium.

In addition, these various catalysts are supposed to also promote the reaction for equilibration of the siloxane bonds by opening the latter with subsequent polymerization of the bonds thus released and, for this reason, formation of volatile cyclic compounds (Journal of Polymer Science, 59, 259-269, 1962).

Condensation processes in the field of silicones can also involve, on the one hand, α,ω-dihydroxylated polydiorganosiloxanes and, on the other hand, silicon-comprising compounds of the di-, tri- or tetraalkoxysilane type. In this type of condensation reaction, the prior technical literature abounds in examples of catalysts also referred to as functionalization catalysts. The following may be mentioned, without implying limitation: amines, inorganic oxides, organic titanium derivatives, titanium/amine combinations, hydroxylamines, aluminum chelates, carbamates and oximes.

All these known catalysts suffer from unacceptable disadvantages. In particular, amines result in low reaction kinetics, even with highly reactive alkoxysilanes, such as alkoxysilanes of formula ViSi(OCH$_3$)$_3$ with Vi=vinyl group. Moreover, amines have an unpleasant smell and are toxic. They contaminate the reaction medium and destabilize the finished products.

Catalysts based on titanium and on hydrocarbon groups, such as tetraisopropoxytitanium, have the harmful effect of causing gelling of the medium, which is a particular nuisance at an industrial stage.

Functionalization catalysts of the potassium acetate type (U.S. Pat. No. 3,504,051) or sodium acetate type (U.S. Pat. No. 3,563,241) are also known; as are carboxylic acid/amine mixtures, as taught by patent FR 2 604 713. Such catalysts suffer from being relatively corrosive and thus difficult to handle. In addition, they do not make it possible to significantly improve the crosslinking kinetics.

U.S. Pat. No. 5,026,811 describes the crosslinking of silicone resins of the polymethylphenylsiloxane type by employing an organometallic catalyst composed of a mixture of alkali metal carboxylates, of an alkali metal carbonate or bicarbonate and optionally of an ammonium carboxylate. The alkali metal selected can, for example, be lithium and the carboxylates selected can, for example, be acetates or 2-ethylhexanoates. These catalytic mixtures exhibit the disadvantage of not being directly soluble in a silicone medium and of giving rise to residues which are difficult to remove.

More recently, functionalization catalysts (SiOH/SiOR condensation) have been provided which are formed of hydroxides of alkali metals, such as sodium or potassium (patents EP 457 693 and U.S. Pat. No. 5,196,497) or else of lithium (U.S. Pat. No. 5,079,324). This novel class of catalysts is targeted at replacing the carboxylates, which appear to a person skilled in the art to be unsuitable, inefficient and defective, when they are employed alone in this application. Unfortunately, these catalysts of the alkali type have the defect of their aggressive nature, which is expressed especially at high temperatures, for example of the order of 100° C. This is because the high alkalinity which they generate brings about decomposition of the reactants and products of the condensation reaction. In addition, this basicity complicates the handling of the reaction medium. Moreover, these inorganic hydroxides, which are insoluble in the silicones, require the use of polar solvents, which bring about the appearance of the regenerated forms of the alkali metal concerned. These forms would cause a phenomenon of lysis of the polymer and/or crosslinked product obtained (reversion).

Thus it is that, in order to improve the catalysis of this type of condensation reaction, European patent application No. 0 564 253 teaches the use of a catalyst composed of a lithium-based organometallic compound which does not require the use of polar or aprotic solvent. More specifically, the catalysts disclosed are lithium silanolates or alkyllithiums, such as tert- or n-butyllithium. It turns out that these known catalysts are still likely to bring about, under hot conditions, decomposition of the reactants and products. This teaching comes within the continuation of the general tendency to improve the catalysis of the SiOH/SiOR reactions by abandoning the carboxylate route. It is necessary to observe that the improvements obtained remain unsatisfactory, with regard to the stability obtained and indeed even with regard to the kinetics obtained.

Metals are thus good catalysts of the condensation reaction, even at ambient temperature. Their effectiveness depends very clearly on the temperature, but these conditions may then promote decomposition side reactions, such as demethylation. Tin, for example in the dibutyltin dilaurate form, is commonly used for its ability to catalyze these reactions at low temperatures, in particular in the case of the network preparation. Unfortunately, this metal is highly toxic and will eventually have to be replaced.

One of the major lines of research in the field of polysiloxanes thus relates to the search for catalysts simultaneously combining performance, specificity and nontoxicity.

Furthermore, platinum/carbene complexes are known as catalysts for the hydrosilylation of a polyorganosiloxane comprising ≡Si-vinyl units by means of a polyorganosiloxane comprising ≡Si—H units. Mention may be made, by way of example, of application PCT WO-A-02/098971, which describes a silicone composition which can be crosslinked to give an elastomer by hydrosilylation in the presence of metal catalysts based on carbenes. This composition comprises:

a polyorganovinylsiloxane poly(dimethyl)-(methylvinyl) siloxane, a polyorganohydrosiloxane, a platinum catalyst formed by a complex (C3) or (C4) of following formulae:

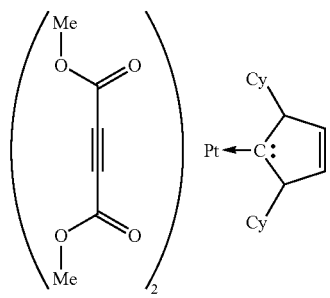
(C3)

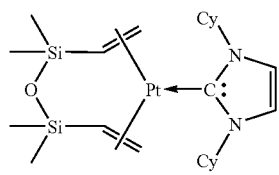
(C4)

optionally a crosslinking inhibitor, and optionally a filler.

Hydrosilylation is neither a condensation reaction nor a polycondensation reaction. In such a hydrosilylation, the carbene acts only as ligand of the platinum and thus does not act as catalyst. Furthermore, the carbenes used as ligands of catalytic metals are also made use of in other fields than those of the silicones. Thus, patent EP-B-0 971 941 describes catalysts based on ruthenium and osmium/carbene complexes for the thermal metathesis of cycloolefins.

In addition, a paper by J. L. Hedrick et al. which appeared in 2002, (JACS, 124, No. 6, pp. 914-915, 2002), teaches that N-heterocyclic carbenes can be used as catalyst for the polymerization of cyclic esters. More specifically, 1,3-bis(2,4,6-trimethylphenyl)-imidazol-2-ylidene was tested as catalyst for the polymerization of L-lactide, ε-caprolactone and β-butyrolactone in the presence of an alcohol used as initiator. From the mechanistic viewpoint, the authors believe that, since the pKa is very high (pKa=24, measured in DiMethyl SulfOxide), the carbene is highly nucleophilic and can thus attack the cyclic ester monomer to give an activated entity capable of attacking the alcohol of the initiator or of the growing chain according to an initiation/propagation process represented below:

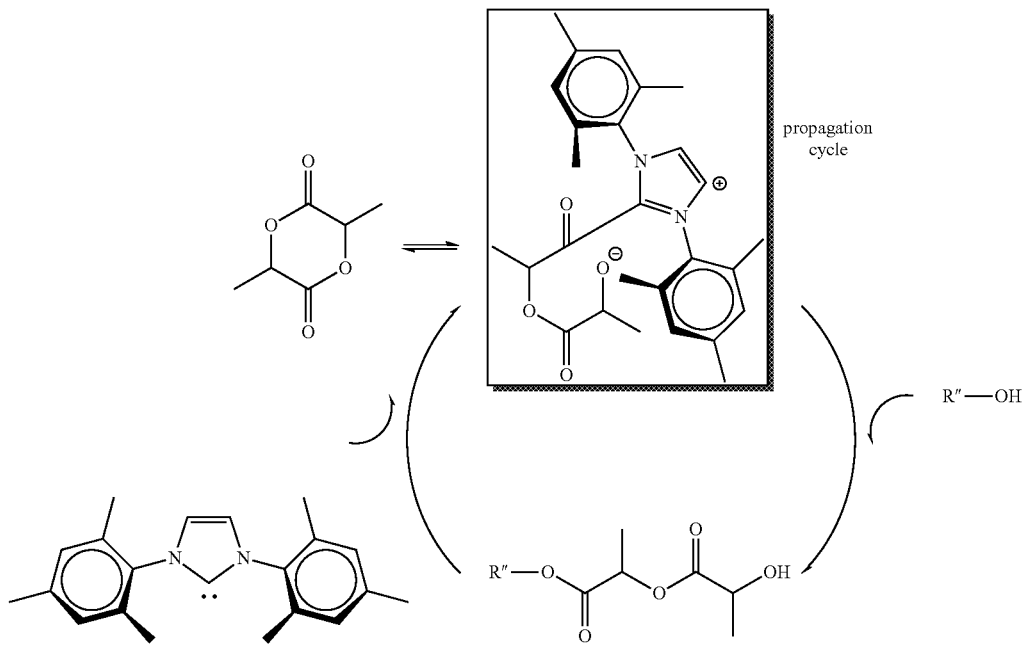

A more recent and fuller paper (cf. JACS, 125, No. 10, pp. 3046-3056, 2003) describes the preparation of carbene in situ to avoid problems of hydrolysis. The promoters used are of thiazolium, imidazolium and imidazolinium type, respectively giving thiazolecarbene, imidazol-2-ylidenecarbene and imidazolin-2-ylidenecarbene catalysts, when they are brought into contact with potassium tert-butoxide. Polymerization tests show that the first family of catalysts does not make it possible to obtain high molecular weights in a profitable and selective manner.

The carbenes obtained by deprotonation of an imidazolium salt in the presence of a strong base have recently been described for the synthesis of polyorganosiloxane silicones by polymerization by the opening of the ring(s) and/or redistribution of linear or cyclic polyorganosiloxanes (patent application FR 2 864 543).

SUMMARY OF THE INVENTION

Under these circumstances, one of the essential objectives of the present invention is to provide a process for SiOH/SiOR condensation between (organo)silicon compounds comprising such Silyl units, which process has to employ nontoxic catalysts.

Another objective of the invention is to provide a condensation process in which the catalyst used is neither corrosive nor aggressive with regard to the reactants and products, which is economic and which, finally, is outstanding with regard to the reaction kinetics achieved.

Another objective of the invention is to provide a condensation process which involves a catalyst directly and readily soluble in a silicone medium.

Another essential objective of the invention is to provide catalysts having the abovementioned specifications.

Another essential objective of the invention it to provide silicone compositions which can be crosslinked, optionally in the presence of water, and which make it possible to obtain elastomers or resins in an economic, fast and simple manner.

Another essential objective of the invention is to provide applications of the abovementioned compositions comprising the condensation catalyst targeted above as constituent component of mastic, of release coating, of adhesive or else of binder for fibrous or nonfibrous composite material.

These objectives and others are achieved by the present invention which relates, first of all, to a process for condensation between at least one ≡SiOH unit and at least one ≡SiOR unit with R=a hydrogen or a $C_1$-$C_{20}$ hydrocarbon group optionally comprising one or more heteroatoms, said ≡SiOH and ≡SiOR units belonging to at least one identical or different (organo)silicon compound P, in the presence of an effective amount of at least one catalyst C, characterized in that the catalyst C is a carbene.

In order to achieve this objective, the inventors have had the credit of demonstrating, entirely surprisingly and unexpectedly, that carbenes or their precursors would be active as catalysts for the condensation reaction of silyl derivatives.

DETAILED DESCRIPTION OF A PREFERRED EMBODIMENT

According to an advantageous characteristic of the invention, the catalyst C comprises two nonbonding electrons which are in the singlet or triplet form, preferably the singlet form.

Preferably, the catalyst C has a general structure represented by the formula (I°):

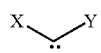
(I°)

in which:
X and Y are chosen independently from the group consisting of: S, P, Si, N and O;
X and Y are optionally substituted;
X and Y can be connected with at least one optionally substituted five-, six- or seven-membered hydrocarbon ring or else one optionally substituted five-, six- or seven-membered heterocycle comprising one or more heteroatoms chosen from the group consisting of: S, P, Si, N and O.

According to one embodiment of the process according to the invention, the carbenes used are advantageously stable carbenes having a general structure represented by the formula (I), (I') or (I''):

in which:
$R^1$, $R^2$ and $R^3$, which are identical or different, independently represent an alkyl group; an optionally substituted cycloalkyl group; an optionally substituted aryl group; or else
the $R^1$ and $R^2$ groups can together form an optionally substituted five- or six-membered hydrocarbon ring or else an optionally substituted five- or six-membered heterocycle comprising one or more heteroatoms chosen from the group consisting of: S, P, Si, N and O.

According to one embodiment of the process according to the invention, the catalyst C corresponds to the formula (II) or (II'):

in which:
A and B independently represent C or N, it being understood that:
in the formula (II), when A represents N, then $T_4$ is not present and, when B represents N, then $T_3$ is not present;
in the formula (II'), when A represents N, then $T_4$ or $T_{4'}$ is not present and, when B represents N, then $T_3$ or $T_{3'}$ is not present;
$T_3$, $T_{3'}$, $T_4$ and $T_{4'}$ independently represent a hydrogen atom; an alkyl group; a cycloalkyl group optionally substituted by an alkyl or alkoxy group; an aryl group optionally substituted by an alkyl or alkoxy group; an alkenyl group; an alkynyl group; or an arylalkyl group in which the aryl part is optionally substituted by an alkyl or alkoxy group; or else
$T_3$ and $T_4$ can form, together and with A and B when the latter each represent the carbon atom, an aryl, it being understood that, in this case, $T_{3'}$ and $T_{4'}$ are not present;

T₁ and T₂ independently represent an alkyl group; an alkyl group optionally substituted by an alkyl group; a perfluorinated alkyl group or an alkyl group optionally substituted by a perfluoroalkyl group; a cycloalkyl group optionally substituted by an alkyl or alkoxy group; an aryl group optionally substituted by an alkyl or alkoxy group; an alkenyl group; an alkynyl group; or an arylalkyl group in which the aryl part is optionally substituted by an alkyl or alkoxy group; or else T₁ and T₂ independently represent a monovalent radical of following formula (V):

—V1-V2  (V)

in which:
V1 is a saturated or unsaturated divalent hydrocarbon group, preferably a linear or branched $C_1$-$C_{10}$ alkylene, which is optionally substituted,
V2 is a monovalent group chosen from the group of the following substituents:
  alkoxy, —OR$^a$ with R$^a$ corresponding to hydrogen, alkyl or aryl;
  silyl, —Si(OR$^b$)$_x$(R$^c$)$_{3-x}$ with R$^b$ corresponding to hydrogen, alkyl, silyl or siloxanyl, R$^c$ corresponding to alkyl or aryl and x being an integer between 0 and 3;
  amine, preferably —N(R$^a$)$_2$ with R$^a$ corresponding to hydrogen, alkyl or aryl; or alternatively
  the T₁, T₂, T₃, T₃', T₄ and T₄' substituents can form, in pairs, when they are situated on two adjacent vertices in the formulae (II) and (II'), a saturated or unsaturated hydrocarbon chain.

The term "alkyl" denotes a saturated, optionally substituted (e.g. by one or more alkyls), linear or branched hydrocarbon chain, preferably of 1 to 10 carbon atoms, for example of 1 to 8 carbon atoms, better still of 1 to 7 carbon atoms.

Examples of alkyl groups are in particular methyl, ethyl, isopropyl, n-propyl, tert-butyl, isobutyl, n-butyl, n-pentyl, isoamyl and 1,1-dimethylpropyl. The alkyl part of the alkoxy group is as defined above. The perfluorinated alkyl group or alkyl group optionally substituted by a perfluoroalkyl group preferably corresponds to the formula:

—(CH₂)$_p$—C$_q$F$_{2q+1}$ in which p represents 0, 1, 2, 3 or 4; q is an integer from 1 to 10; and C$_q$F$_{2q+1}$ is linear or branched. Preferred examples of this group are: —(CH₂)₂—(CF₂)₅—CF₃ and —(CF₂)₇—CF₃.

The expression "aryl" denotes an aromatic, monocyclic or polycyclic and preferably monocyclic or bicyclic, hydrocarbon group having from 6 to 18 carbon atoms. It should be understood that, in the context of the invention, the term "aromatic polycyclic group" is understood to mean a group exhibiting two or more aromatic nuclei which are fused (ortho-fused or ortho- and peri-fused) to one another, that is to say exhibiting, in pairs, at least two common carbons. Said aromatic hydrocarbon group ("aryl") is optionally substituted, for example by one or more $C_1$-$C_3$ alkyls, one or more halogenated hydrocarbon groups (e.g. CF₃), one or more alkoxys (e.g. CH₃O) or one or more hydrocarbon groups comprising one or more ketone units (e.g. CH₃CO—).

Mention may be made, as examples of aryl, of the phenyl, naphthyl, anthryl and phenanthryl radicals.

The expression "arylalkyl" denotes an alkyl group as defined above substituted by one or more aryl groups on its hydrocarbon chain, the aryl group being as defined above. Examples thereof are benzyl and triphenylmethyl.

The term "cycloalkyl" is understood to mean a saturated, mono- or polycyclic, preferably mono- or bicyclic, hydrocarbon group preferably exhibiting from 3 to 10 carbon atoms, better still from 3 to 8 carbon atoms. The term "saturated polycyclic hydrocarbon group" is understood to mean a group exhibiting two or more cyclic nuclei attached to one another via σ bonds and/or fused in pairs. Examples of polycyclic cycloalkyl groups are adamantane and norbornane. Examples of monocyclic cycloalkyl groups are cyclopropyl, cyclobutyl, cyclopentyl, cyclohexyl, cycloheptyl and cyclooctyl.

The term "alkenyl" is understood to mean an unsaturated, substituted or unsubstituted, linear or branched, hydrocarbon chain exhibiting at least one olefinic double bond and more preferably just one double bond. Preferably, the alkenyl group exhibits from 2 to 8 carbon atoms, better still from 2 to 6 carbon atoms. This hydrocarbon chain optionally comprises at least one heteroatom, such as O, N or S. Preferred examples of alkenyl groups are the allyl and homoallyl groups.

The term "alkynyl" is understood to mean, according to the invention, an unsaturated, substituted or unsubstituted, linear or branched, hydrocarbon chain exhibiting at least one acetylenic triple bond and more preferably just one triple bond. Preferably, the alkynyl group exhibits from 2 to 8 carbon atoms, better still from 2 to 6 carbon atoms. Mention may be made, by way of example, of the acetylenyl group and the propargyl group. This hydrocarbon chain optionally comprises at least one heteroatom, such as O, N or S.

The term "silyl" is understood to mean, according to the invention, a linear or branched group comprising at least one silicon atom. Polydimethylsiloxane chains are examples of silyl groups.

The carbenes of formulae (II) and (II') can exhibit at least two fused nuclei, that is to say that two groups at least from T₁, T₂, T₃, T₃' T₄ and T₄' situated on two adjacent vertices together form a saturated or unsaturated hydrocarbon chain preferably exhibiting from 3 to 6 carbon atoms. The term "saturated or unsaturated hydrocarbon chain" is understood to mean a linear or branched hydrocarbon chain which may or may not exhibit one or more unsaturations of olefinic double bond or acetylenic triple bond type.

As regards the implementational forms preferred in the formula (II) or (II'), these are forms in which A=B=carbon atom in the formula (II) given above.

Preferred meanings for T₁ and T₂ in this formula (II) are:
alkyl, in particular n-propyl, n-pentyl or neopentyl (—CH₂—C(CH₃)₃);
cycloalkyl, in particular cyclopentyl, cyclohexyl or adamantyl;
alkenyl, in particular allyl (—CH₂—CH═CH₂), methallyl (—CH₂—C(CH₃)═CH₂);
alkynyl, in particular propargyl or homopropargyl (—(CH₂)₂—C≡CH); or
a monovalent group (V) defined above, in particular:

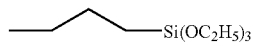

Still in the formula (II) and preferably, T₃ and T₄ both correspond to hydrogen or together form an aryl and better still a phenyl.

Mention may be made, as examples of carbenes, of those described in table 2, page 48, of the publication by Bourissou et al., "*Chem Rev.*, 2000, 100, 39-91". This table 2, page 48, is included by reference in the present account.

In accordance with the invention, the carbene(s):
is (are) prepared separately,
and/or is (are) generated in situ from at least one precursor.

Advantageously, the precursor(s) is (are) a salt(s) corresponding to the carbene(s) which is (are) reacted with at least one base so as to generate the carbene(s) in situ.

Thus, for the preferred carbenes of formulae (II) and (II'), the corresponding salt(s) is (are) a corresponding heterocyclic salt(s) of general formula (III) or (III'):

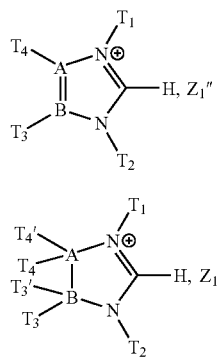

in which:
A, B, $T_1$, $T_2$, $T_3$, $T_{3'}$, $T_4$ and $T_{4'}$ are as defined above;
$Z_1$ independently represents an anion derived from a Brönsted acid (protic acid) preferably chosen from the group consisting of:
carboxylic acids of formula $G_o$-COOH in which $G_o$ represents an alkyl and advantageously a $C_1$-$C_{22}$ alkyl; or an aryl, advantageously a $C_6$-$C_{18}$ aryl, optionally substituted by one or more $C_1$-$C_6$ alkyls;
sulfonic acids of formula $G_o$-$SO_3H$ in which $G_o$ is as defined above;
phosphonic acids of formula $G_o$-$PO_3H$ in which $G_o$ is as defined above;
the following inorganic acids: HF, HCl, HBr, HI, $H_2SO_4$, $H_3PO_4$, $HClO_4$ and $HBF_4$, taken by themselves alone or in combination with one another;
and their mixtures.

As regards the salt (III), the $Z_1^-$ anion is the anion derived from an organic or inorganic Brönsted acid (protic acid). Usually, the $Z_1^-$ anion is derived from an acid exhibiting a pKa of less than 6. Preferably, $Z_1^-$ derives from an acid with a pKa of less than 4, better still of less than 2. The pKa values concerned here are the pKa values of the acids as measured in water. Examples of acids are carboxylic acids of formula:

in which $G_o$ represents alkyl, for example ($C_1$-$C_{22}$)alkyl; or else aryl, for example ($C_6$-$C_{18}$)aryl, optionally substituted by one or more alkyls, preferably one or more ($C_1$-$C_6$) alkyls; sulfonic acids of formula: $G_o$-$SO_3H$, in which $G_o$ is as defined above; and phosphonic acids of formula: $G_o$-$PO_3H$, in which $G_o$ is as defined above; other acids are HF, HCl, HBr, $H_1$, $H_2SO_4$, $H_3PO_4$, $HClO_4$ and $HBF_4$.

Preferred examples of carboxylic acids are acetic acid, benzoic acid and stearic acid. Mention will be made, as preferred sulfonic acid, of benzenesulfonic acid and mention will be made, as preferred phosphonic acid, of phenylphosphonic acid.

According to the invention, preference is more particularly given to the $Z_1^-$ anions derived from the acids HCl, HI, $HBF_4$ and $HPF_6$.

Thus, $Z_1^-$ anions which are particularly preferred according to the invention are the halide anions and tetrafluoroborate and hexafluorophosphate.

A few examples of imidazolium salts are given below.

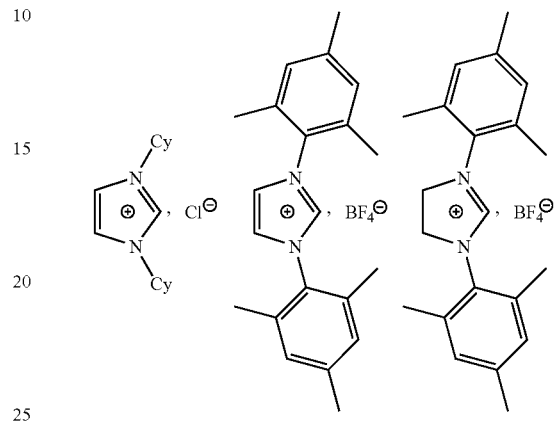

These supplies are either commercially available or are easily prepared by a person skilled in the art from commercially available compounds.

A method for the synthesis of the salts of formula (III) in which A=B=C is described in U.S. Pat. No. 5,077,414. This process comprises the reaction:
of an α-dicarbonyl compound of following formula (X):

in which $T_6$ and $T_7$ represent, independently of one another, a hydrogen or an optionally substituted hydrocarbon group;
with HCHO and two amines of formulae $T_7$-$NH_2$ and $T_8$-$NH_2$ in the presence of an appropriate acid with $T_7$ and $T_8$ representing, independently of one another, an optionally substituted hydrocarbon group.

The nature of the $Z_1$ anion in the salts of formula (III) depends on the acid used in this stage. The acids which can be used are, for example, those listed above and those from which $Z_1$ derives.

Other methods for the preparation of the salts of formula (III) are provided in Chem. Eur. J., 1996, 2, No. 12, pages 1627-1636, and Angew. Chem. Int. Ed. Engl., 1997, 36, 2162-2187.

The carbenes according to the invention can also be generated in situ by thermal activation of a precursor prepared by condensation of a diamine and of an aldehyde with acid catalysis. This type of precursor, referred to as N-heterocyclic carbene, or NHC, is described in Chem. Eur. J., 2004, 10, pages 4073-4079. In particular, the precursors of carbenes described in table 1, page 4076, are included by reference in the present account.

According to a preferred methodology, the process is carried out, by homogeneous catalysis, in a liquid reaction medium in which the catalyst C based on carbene(s) and/or its precursor(s) and the (organo)silicon compounds P and optionally at least one base are at least partially dissolved.

Advantageously, the solubility of the catalyst C based on carbene(s) and/or of its precursor(s) is controlled using at least one solubilization aid and/or by using a carbene(s) substituted by at least one appropriate group.

Mention may be made, as examples of solubilization aids, of solvents such as TetraHydroFuran (THF), toluene, and the like. Mention may be made, as examples of solubilization groups, of alkyls, aryls, fluorinated groups, silyls, siloxanes, such as PolyDiMethylSiloxane chains, and the like.

These groups can belong to the formulae (I'), (I), (I'), (II), (II'), (III) and (III') defined above.

One of the surprising advantages of the carefully selected carbenes in accordance with the invention is due to the possibility of rapid reaction at low temperature. Thus, the process is characterized in that the condensation or polycondensation reaction is carried out at a temperature T (° C.) such that:

|  | T ≤ 200 |
|---|---|
| preferably | 100 ≤ T ≤ 150 |
| and more preferably still | T ≤ 100. |

In practice, it can be ambient temperature, which is particularly economic and easy to implement industrially. However, in order to reduce the viscosity of the silicone phase, it is just as possible to operate at a higher temperature. The process according to the invention offers great flexibility in this regard.

Quantitatively, the concentration of catalyst C (in moles per 100 g of starting (organo)silicon compound P) in the reaction medium is such that:

|  | [C] ≤ 1 |
|---|---|
| preferably | $10^{-5} \leq [C] \leq 10^{-1}$ |
| and more preferably still | $10^{-5} \leq [C] \leq 10^{-3}$. |

According to a preferred form of the invention, the (organo)silicon compound P is a polyorganosiloxane A, at least one of the silicon ends of which comprises at least one hydroxyl or one radical which can be hydrolyzed or condensed, said polyorganosiloxane preferably corresponding to the following formula ($A_1$):

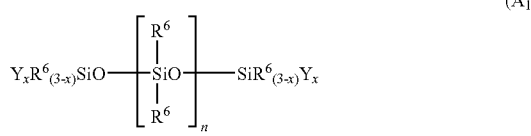

(A₁)

with:
x=0, 1, 2 or 3;
n being an integer greater than or equal to 1 and preferably greater than or equal to 10;
the $R^6$ radicals being identical to or different from one another and corresponding to hydrogen or to $C_1$-$C_{20}$ hydrocarbon groups, preferably of the following types: alkyl, cycloalkyl, alkenyl, cycloalkenyl, (cyclo)alkynyl, which is linear or branched, aryl, aralkyl or alkylaryl, which is optionally substituted, advantageously by one or more halogens, the methyl, ethyl, propyl and butyl radicals being more particularly preferred;
Y representing identical or different hydrolyzable or condensable groups or alternatively hydroxyl groups and preferably an —OR' group with R' having the same definition as $R^6$, as stated above, and being able to additionally correspond to $C_1$-$C_{20}$ hydrocarbon groups optionally comprising one or more heteroatoms and in particular comprising oxime, enoxy ether or polyether units;
it being possible for at least a portion of the $R^6$ radicals optionally to correspond to Y, and
at least two Y groups being present in the structure of the polyorganosiloxane A.

The viscosity of oils of formula ($A_1$) is generally between 10 and $10^6$ mPa·s at 25° C. Mention may be made, as examples of $R^6$ radicals, of the alkyl radicals having from 1 to 8 carbon atoms, such as methyl, ethyl, propyl, butyl, hexyl and octyl, the vinyl radicals or the phenyl radicals. Mention may be made, as examples of substituted $R^6$ radicals, of the 3,3,3-trifluoropropyl, chlorophenyl and β-cyanoethyl radicals.

In the products of formula ($A_1$) generally used industrially, at least 60% by number of the $R^6$ radicals are methyl radicals, the other radicals generally being phenyl and/or vinyl radicals.

Mention may be made, as examples of hydrolyzable Y groups, of the hydroxyl, aminoxy, ketiminoxy, iminoxy, alkoxy or alkoxyalkyleneoxy groups.

Mention may be made, as alkoxy Y groups, of the groups having from 1 to 8 carbon atoms, such as the methoxy, ethoxy, propoxy, isopropoxy, butoxy, hexyloxy and octyloxy groups, and mention may be made, as alkoxyalkyleneoxy Y group, of the methoxyethyleneoxy group.

According to an advantageous characteristic of the invention, $R^6$ can comprise at least one polymerization and/or crosslinking reactive functional group advantageously composed of an unsaturated and preferably ethylenically unsaturated (e.g., vinyl, (meth)acrylic) unit or of an epoxidized (e.g., β-(3,4-epoxycyclohexyl)ethyl or glycidoxypropyl) unit. The reactivity thus introduced can give rise to a functionalization or crosslinking other than that by condensation which can, for example, be photoactivated and/or thermally activated, in the presence or absence of crosslinking initiators.

Mention may be made, as examples of such polyorganosiloxanes A, of the α,ω-dihydroxylated organopolyorganosiloxanes of formula ($A_1$). These are generally oils having a viscosity at 25° C. varying from 500 mPa·s to 500 000 mPa·s, preferably from 800 mPa·s to 400 000 mPa·s. These are linear polymers essentially composed of diorganosiloxyl units of formula $(R^6)_2SiO_{2/2}$ and terminated by units with the structure $(R^6)_3SiO_{1/2}$. However, the presence of other units present generally as impurities, such as $R^6SiO_{3/2}$ and $SiO_{4/2}$, is not ruled out in the proportion of at most 1%, with respect to the number of diorganosiloxyl units.

In practice, the organic radicals bonded to the silicon atoms of the base oils is represented by the $R^6$ symbols can advantageously be chosen from the alkyl radicals having from 1 to 3 carbon atoms, such as the methyl, ethyl or n-propyl radicals, the vinyl radical, the phenyl radical, the 3,3,3-trifluoropropyl radical and the β-cyanoethyl radical. Preferably, at least 60% of all the $R^6$ radicals are methyl radicals and at most 1% are vinyl radicals.

Mention may be made, by way of illustration of the unit represented by the formula $(R^6)_2SiO_{2/2}$, of those of formulae: $(CH_3)_2SiO_{2/2}$, $(CH_3)(CH_2{=}CH)SiO_{2/2}$ and $CH_3(C_6H_5)SiO_{2/2}$.

The great majority of these base oils are sold by silicone manufacturers. Furthermore, their manufacturing techniques are well known; for example, they are found described in French patents FR-A-1 134 005, FR-A-1 198 749 and FR-A-1 226 745.

Mention may be made, as other examples of (organo)silicon compound P, of polyorganosiloxanes with a cyclic structure comprising from 3 to 15 siloxane units, preferably from 3 to 6 siloxane units, at least one of said units carrying at least one Y functionality as defined above.

According to an alternative, the (organo)silicon compound P can be composed of a polymer $A_2$ formed of a linear or cyclic hydrocarbon backbone comprising at least one silyl or siloxyl unit $(R^6_{3-x})(Y_x)SiO$,
with x=0, 1, 2 or 3, and
$R^6$ and Y are as defined above.

In the case where $A_2$ is linear, it advantageously comprises such a silyl or siloxyl unit at least one of its ends, preferably at both ends. The linear hydrocarbon backbone can, for example, be a (co)polymer, preferably of the polyurethane, polyamide or polyether type and the like.

According to another preferred form of the invention, the (organo)silicon compound P is a silicon-comprising compound B which is a silane of following general formula (B):

$$R^7_{4-a}SiY'_a \quad (B)$$

in which:
R$^7$ are identical to or different from one another and correspond to hydrogen or to $C_1$-$C_{12}$ hydrocarbon groups, preferably of the following types: alkyl, cycloalkyl, alkenyl, cycloalkenyl, (cyclo)alkynyl, which is linear or branched, aryl, aralkyl or alkylaryl, which is optionally substituted, advantageously by one or more halogens, the methyl, ethyl, propyl and butyl radicals being more particularly preferred;

Y' represents identical or different hydrolyzable or condensable groups or alternatively hydroxyl groups and preferably an —OR' group with R' having the same definition as $R^7$, as stated above, and being able to additionally correspond to $C_1$-$C_{20}$ hydrocarbon groups optionally comprising one or more heteroatoms and in particular comprising:
an oxime residue of formula:

$$(R^8)_2C=N-O-$$

with $R^8$ independently representing a linear or branched $C_1$ to $C_8$ alkyl, a $C_3$ to $C_8$ cycloalkyl or a $C_2$-$C_8$ alkenyl,
an alkoxy residue of formula:

$$R^9O(CH_2CH_2O)_b-$$

with $R^9$ independently representing a linear or branched $C_1$ to $C_8$ alkyl or a $C_3$ to $C_8$ cycloalkyl and b=0 or 1;
an acyl residue of formula:

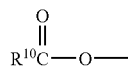

with $R^{10}$ representing a saturated or unsaturated, substituted or unsubstituted, branched or unbranched, aliphatic, cyclanic or aromatic, monovalent $C_1$ to $C_{13}$ hydrocarbon radical, or
an enoxy residue of formula:

$$R^{11}R^{11}C=CR^{11}-O-$$

with the $R^{11}$ groups, which are identical or different, representing a hydrogen or a saturated or unsaturated, substituted or unsubstituted, branched or unbranched, aliphatic, cyclanic or aromatic, monovalent $C_1$ to $C_{13}$ hydrocarbon radical, and a is equal to 3 or 4.

Mention may more particularly be made, as examples of silicon-comprising compound B, of polyacyloxysilanes, polyalkoxysilanes, polyketiminoxysilanes and polyiminoxysilanes and in particular of the following silanes:

$CH_3Si[ON=C(CH_3)(C_2H_5)]_3$; $CH_2=CH-Si[ON=C(CH_3)C_2H_5)]_3$;
$CH_3Si(ON=CH-CH_3)_3$
$Si(OCH_3)_4$
$Si(OCH_2CH_3)_4$
$Si(OCH_2CH_2CH_3)_4$
$(CH_3O)_3SiCH_3$
$(C_2H_5O)_3SiCH_3$
$(CH_3O)_3SiCH=CH_2$
$(C_2H_5O)_3SiCH=CH_2$
$(CH_3O)_3SiCH_2-CH=CH_2$
$(CH_3O)_3Si[CH_2-(CH_3)C=CH_2]$
$(C_2H_5O)_3Si(OCH_3)$
$Si(OCH_2-CH_2-OCH_3)_4$
$CH_3Si(OCH_2-CH_2-OCH_3)_3$
$CH_2=CHSi(OCH_2CH_2OCH_3)_3$
$C_6H_5Si(OCH_3)_3$
$C_6H_5Si(OCH_2-CH_2-OCH_3)_3$
$H-Si(OCH_3)_3$ and $HSi(OC_2H_5)_3$
$(CH_3O)_3Si-[-(CH_2)_2-CH_2Cl]$
$(CH_3O)_3Si-[-(CH_2)_3-OOC-(CH_3-)C=CH_2]$
$(C_2H_5O)_3Si-(CH_2)_2-CH_2Cl$
$(CH_3O)_3Si-(CH_2)_3-NH_2$
$(C_2H_5O)_3Si-(CH_2)_3-NH_2$
$(CH_3O)_3Si-(CH_2)_3-NH-(CH_2)_2-NH_2$
$(C_2H_5O)_3Si-(CH_2)_3-NH-(CH_2)_2-NH_2$
$(CH_3O)_3Si-(CH_2)_3-SH$
$(CH_3)CH_2=CH)Si(OCH_3)_2$; and
their mixtures.

The silanes which are more particularly preferred are the following:
$Si(OC_2H_5)_4$, $CH_3Si(OCH_3)_3$, $CH_3Si(OC_2H_5)_3$, $(C_2H_5O)_3Si(OCH_3)$, $CH_2=CH-Si(OCH_3)_3$
$CH_3(CH_2=CH)Si(OCH_3)_2$, $CH_2=CH-Si(OC_2H_5)_3$; and
their mixtures.

According to another alternative form of the invention, the (organo)silicon compound P is a polyorganosiloxane resin D, functionalized by at least one Y' radical as defined above, exhibiting, in its structure, at least two different siloxyl units chosen from those of formulae $(R^{12})_3SiO_{1/2}$ (M unit), $(R^{12})_2SiO_{2/2}$ (D unit), $R^{12}SiO_{3/2}$ (T unit) and $SiO_{4/2}$ (Q unit), at least one of these units being a T or Q unit, the $R^{12}$ radicals, which are identical or different, each representing a saturated or unsaturated, substituted or unsubstituted, aliphatic, cyclanic or aromatic, monovalent $C_1$ to $C_{13}$ hydrocarbon radical.

These silicone resins are well known branched polyorganosiloxane polymers, the processes for the preparation of which are described in numerous patents. Mention may be made, as concrete examples of resins which can be used, of MQ, MDQ, TD and MDT resins functionalized by Y' groups as defined above.

More preferably, mention may be made, as examples of resins which can be used, of functionalized TD and MDT resins comprising at least 20% by weight of T units and having a content by weight of Y' group ranging from 0.3 to 5%. More preferably still, use is made of resins of this type where, in the structure of which, at least 80% by number of the $R^{12}$ substituents are methyl radicals. The Y' functional groups of the resins can be carried by the M, D and/or T units.

According to another preferred alternative form of the invention, the condensation reaction is carried out between at least one silicon-comprising compound A and/or B and/or D as defined above.

Another subject matter of the invention is a silicone composition which can be crosslinked, optionally in the presence of water, characterized in that it comprises:
- at least one silicon-comprising compound A and/or B and/or D as defined above, and
- at least one catalyst C as defined above.

In addition to this distinction according to their constituents, it is also possible to divide the silicone compositions of the invention into two main families.

The first family is composed of single-component systems or systems comprising just one container which is stable on storage with the exclusion of atmospheric moisture. In this case, the curing to give an elastomer is carried out by thermal activation of the carbene precursor, for example (NHC), as described above.

The second family is composed of multicomponent systems or systems comprising several containers, preferably 2, in which the catalyst C is separated from the entities capable of crosslinking.

It should be noted that the compositions or the systems according to the invention can comprise fillers and/or plasticizers which preferably have a neutral or slightly basic nature and which do not have a harmful impact on the catalyst C.

The fillers which can be envisaged are reinforcing or semi-reinforcing or bulking fillers. They are preferably chosen from neutral or basic siliceous fillers of the diatomaceous earth silicas type or from carbonates. These silicas have a specific surface, measured according to the BET methods, of at least 50 m$^2$/g, preferably of greater than 70 m$^2$/g, a mean size of the primary particles of less than 0.1 μm (micrometer) and a bulk density of less than 200 g/liter.

These silicas can be incorporated preferably as they are or after having been treated with organosilicon compounds commonly employed for this use. These compounds include methylpolysiloxanes, such as hexamethyldisiloxane or octamethylcyclotetrasiloxane, methylpolysilazanes, such as hexamethylsilazane or hexamethylcyclotrisilazane, chlorosilanes, such as dimethyldichlorosilane, trimethylchlorosilane, methylvinyldichlorosilane or dimethylvinylchlorosilane, or alkoxysilanes, such as dimethyldimethoxysilane, dimethylvinylethoxysilane or trimethylmethoxysilane. The bases for silicone compositions defined in general fashion above are well known to a person skilled in the art. They are described in detail in the literature, in particular in numerous patents, and the majority are commercially available.

Another subject matter of the invention is therefore the use of the composition described above or of the system of crosslinkable silicone elastomers as described above:
- in the preparation of coatings, in particular release coatings, for solid supports of varied nature, advantageously of stone, concrete, metal, wood, glass, ceramic, paper or board;
- in the coating of woven or nonwoven fibrous materials,
- as binder, in particular water-repellent binder, for fibrous or nonfibrous composite materials, said optional fibers being inorganic or organic, or
- as mastic or leakproofing material.

The following examples will make possible a better understanding of the process and the catalyst according to the invention by bringing out all their advantages and the possible alternative embodiments.

EXAMPLES

General Points

The carbene C used is the dicyclohexyldiaminocarbene obtained by deprotonation from the corresponding imidazolium triflate:

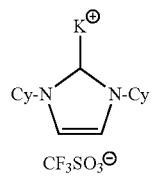

according to the following procedure:

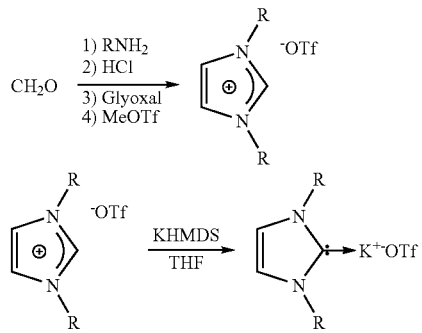

The other starting materials are commercially available.

Example 1

The following are mixed in a 30 ml flask:
a) an amount of 3 ml of a silicone oil of formula:

with
$M^{OH}$=(CH$_3$)$_2$(OH)SiO$_{1/2}$
D: (CH$_3$)$_2$SiO$_{2/2}$
this oil has been devolatilized in order to remove cyclic oligomers; and
b) a variable amount of a catalyst C.

The mixture is stirred and heated at 80° C. for 16 h.
The results are combined in table 1.

TABLE 1

| Tests | 1 | 2 | 3 | 4 |
|---|---|---|---|---|
| $M^{OH}$-D$_{10}$-M$^{OH}$ | 3 ml | 3 ml | 3 ml | 3 ml |
| Carbene C (ppm) | 0 | 2500 | 5000 | 10 000 |
| Mn | 484 | 67 236 | 62 160 | 48 006 |
| Mw | 1029 | 112 896 | 109 152 | 90 932 |
| Polydispersity (Mw/Mn) | 2.12 | 1.67 | 1.75 | 1.89 |
| Conversion (% by NMR) | — | 90.7 | 89.1 | 90.5 |

Mn = number-average molar mass
Mw = weight-average molar mass

DISCUSSIONS

This example shows that the catalysts of carbene type according to the invention catalyze the polycondensation of silanols. This experimental fact is novel and not described in the prior art.

What is claimed is:

1. A process for condensation between at least one ≡SiOH unit and at least one ≡SiOR unit with R representing a hydrogen or a $C_1$-$C_{20}$ hydrocarbon group optionally comprising one or more heteroatoms, said ≡SiOH and ≡SiOR units belonging to at least one identical or different (organo)silicon compound P, in the presence of an effective amount of at least one catalyst C, comprising a carbine, wherein:

a) the (organo)silicon compound P is a polyorganosiloxane corresponding to formula $A_1$:

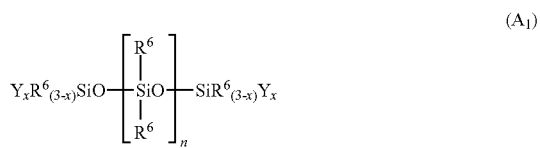

(A₁)

with:

x=0, 1, 2, or 3;

n being an integer greater than or equal to 1;

$R^6$ being identical to or different from one another and corresponding to hydrogen or to $C_1$-$C_{20}$ hydrocarbon, optionally substituted by one or more halogens;

Y represents identical or different —OR' groups, with R' having the same definition as $R^6$ above, and being able to additionally correspond to $C_1$-$C_{20}$ hydrocarbon groups optionally comprising one or more heteroatoms; and b) the (organo)silicon compound P is a silicon-comprising compound B which is a silane of following formula (B):

(B)

in which:

$R^7$ are identical to or different from one another and correspond to hydrogen or to $C_1$-$C_{12}$ hydrocarbon groups, which is optionally substituted by one or more halogens;

Y' represents identical or different —OR' groups, with R' having the same definition as $R^7$ above, and being able to additionally correspond to $C_1$-$C_{20}$ hydrocarbon groups optionally comprising one or more heteroatoms; and/or c) the (organo)silicon compound P is a polyorganosiloxane resin D, functionalized by at least one Y' radical wherein Y' represents identical or different —OR' groups, with R' having the same definition as $R^7$ above, exhibiting in its structure at least two different siloxyl units chosen from those of formulae $(R^{12})_3SiO_{1/2}$ (M unit), $(R^{12})_2SiO_{2/2}$ (D unit), $R^{12}SiO_{3/2}$ (T unit) and $SiO_{4/2}$ (Q unit), at least one of these units being a T or Q unit, the $R^{12}$ radicals, which are identical or different, each representing a saturated or unsaturated, substituted or unsubstituted, aliphatic, cyclanic or aromatic, monovalent $C_1$ to $C_{13}$ hydrocarbon radical and wherein, the catalyst C corresponds to the formula (II) or (II'):

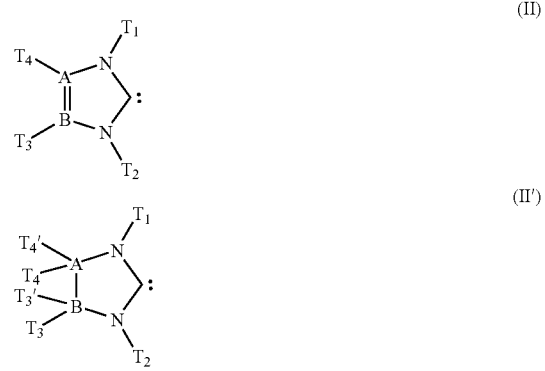

in which:

A and B independently represent C or N, it being understood that:

in the formula (II), when A represents N, then $T_4$ is not present and, when B represents N, then $T_3$ is not present;

in the formula (II'), when A represents N, then $T_4$ or $T_{4'}$ is not present and, when B represents N, then $T_3$ or $T_{3'}$ is not present;

$T_3$, $T_{3'}$, $T_4$ and $T_{4'}$ independently represent a hydrogen atom; an alkyl group; a cycloalkyl group optionally substituted by an alkyl or alkoxy group; an aryl group optionally substituted by an alkyl or alkoxy group; an alkenyl group; an alkynyl group; or an arylalkyl group in which the aryl part is optionally substituted by an alkyl or alkoxy group; or else $T_3$ and $T_4$ can form, together and with A and B when the latter each represent a carbon atom, an aryl, it being understood that, in this case, $T_{3'}$ and $T_{4'}$ are not present;

$T_1$ and $T_2$ independently represent an alkyl group; an alkyl group optionally substituted by an alkyl group; a perfluorinated alkyl group or an alkyl group optionally substituted by a perfluoroalkyl group; a cycloalkyl group optionally substituted by an alkyl or alkoxy group; an aryl group optionally substituted by an alkyl or alkoxy group; an alkenyl group; an alkynyl group; or an arylalkyl group in which the aryl part is optionally substituted by an alkyl or alkoxy group; or else $T_1$ and $T_2$ independently represent a monovalent radical of following formula (V):

—V1-V2 (V)

in which:

V1 is a saturated or unsaturated divalent hydrocarbon group, which is optionally substituted, V2 is a monovalent group selected from the group consisting of the following substituents:

alkoxy, —$OR^a$ with $R^a$ corresponding to hydrogen, alkyl or aryl;

silyl, —$Si(OR^b)_x(R^c)_{3-x}$ with $R^b$ corresponding to hydrogen, alkyl, silyl or siloxanyl, $R^c$ corresponding to alkyl or aryl and x being an integer between 0 and 3;

amine; or alternatively the $T_1$, $T_2$, $T_3$, $T_{3'}$, $T_4$ and $T_{4'}$ substituents can form, in pairs, when they are situated on two adjacent vertices in the formulae (II) and (II'), a saturated or unsaturated hydrocarbon chain.

2. The process as claimed in claim 1, wherein the catalyst C:
is prepared separately, and/or
is generated in situ from at least one precursor.

3. The process as claimed in claim 2, wherein the precursor is a salt corresponding to the carbene which is reacted with at least one base so as to generate the catalyst C in situ.

4. The process as claimed in claim 3, wherein the corresponding salt is a corresponding heterocyclic salt of formula (III) or (III'):

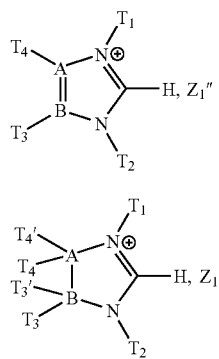

in which:
$Z_1$ independently represents an anion derived from a Brönsted acid.

5. The process as claimed in claim 1, wherein the condensation reaction is carried out between:

i) at least one silicon-comprising compound polyorganosiloxane $A_1$; and
ii) a silicon compound B; and
iii) a polyorganosiloxane resin D.

6. The process as claimed in claim 1, wherein said process is carried out, by homogeneous catalysis, in a liquid reaction medium in which the catalyst C and/or its precursor and said starting organosilicon compound and optionally at least one base are at least partially dissolved.

7. The process as claimed in claim 1, wherein the solubility of the catalyst C and/or of its precursor is controlled using at least one solubilization aid and/or by using a carbene substituted by at least one appropriate group.

8. The process as claimed in claim 1, wherein said process is essentially carried out at a temperature T (° C.) such that: $T \leq 200$.

9. A silicone composition which can be crosslinked by a process according to claim 1, optionally in the presence of water, wherein said composition comprises:
at least one silicon-comprising compound $A_1$ and B and/or D, and
at least one catalyst C.

10. A composition as claimed in claim 9 which is useful:
in the preparation of coatings, for solid supports of varied nature, advantageously of stone, concrete, metal, wood, glass, ceramic, paper or board;
in the coating of woven or nonwoven fibrous materials,
as binder, for fibrous or nonfibrous composite materials, said optional fibers being inorganic or organic, and/or
as mastic or leakproofing material.

11. The process of claim 1, wherein:
$R^6$ of formula $A_1$ is alkyl, cycloalkyl, alkenyl, cycloalkenyl, linear or branched (cyclo)alkynyl, aryl, aralkyl or alkylaryl; and
Y of formula $A_1$ is oxime, enoxy ether, or polyether.

12. The process of claim 1, wherein B is
polyacyloxysilane, polyalkoxysilane, polyketiminoxysilane, or polyiminoxysilane.

* * * * *